United States Patent
Zhan et al.

(10) Patent No.: US 10,338,917 B2
(45) Date of Patent: Jul. 2, 2019

(54) METHOD, APPARATUS, AND SYSTEM FOR READING AND WRITING FILES

(71) Applicant: Alibaba Group Holding Limited, Grand Cayman (KY)

(72) Inventors: Huaimin Zhan, Hangzhou (CN); Hualing Dong, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/895,927

(22) Filed: Feb. 13, 2018

(65) Prior Publication Data
US 2018/0173521 A1 Jun. 21, 2018

Related U.S. Application Data

(63) Continuation of application No. PCT/CN2016/093493, filed on Aug. 5, 2016.

(30) Foreign Application Priority Data

Aug. 14, 2015 (CN) .......................... 2015 1 0500501

(51) Int. Cl.
*G06F 17/30* (2006.01)
*H04L 29/08* (2006.01)
(Continued)

(52) U.S. Cl.
CPC .................. *G06F 8/71* (2013.01); *G06F 8/33* (2013.01); *G06F 16/162* (2019.01); *G06F 16/172* (2019.01); *G06F 16/1774* (2019.01)

(58) Field of Classification Search
CPC ... H04L 63/08; H04L 63/0815; H04L 63/083; H04L 63/10; H04L 63/0428; G06F 21/41;
(Continued)

(56) References Cited

U.S. PATENT DOCUMENTS 5,615,373 A 3/1997 Ho
8,260,816 B1 * 9/2012 Vaghani .............. G06F 16/1774
707/791
(Continued)

FOREIGN PATENT DOCUMENTS

CN 102193959 9/2011
CN 103345482 10/2013
(Continued)

OTHER PUBLICATIONS

S. Vaghani, Virtual machine file system, 14 pages (Year: 2010).*
(Continued)

Primary Examiner — Thuy Dao
(74) Attorney, Agent, or Firm — Lee & Hayes, P.C.

(57) ABSTRACT

A method for reading and writing files includes: receiving an access request, and acquiring file identifier information and first user identifier information according to the access request; querying a cache server for a locked file corresponding to the file identifier information, and acquiring a first original file corresponding to the file identifier information from a file server if the locked file corresponding to the file identifier information is not found; generating a locked file according to the first user identifier information and the first original file, and submitting the locked file to the cache server; and receiving an editing operation for the first original file, and submitting the edited first original file to the cache server. The method prevents the users from submitting conflicting contents when operating the same file, so that a Web IDE system may play a more important role in multiple collaborative development processes.

20 Claims, 8 Drawing Sheets

(51) Int. Cl.
*H04L 29/06* (2006.01)
*G06F 8/71* (2018.01)
*G06F 16/16* (2019.01)
*G06F 16/172* (2019.01)
*G06F 16/176* (2019.01)
*G06F 8/33* (2018.01)

(58) Field of Classification Search
CPC ......... G06F 2221/2107; G06F 21/6218; G06F 21/6209; G06F 16/1774; G06F 16/182; G06F 16/162; G06F 16/172; G06F 8/71; G06F 8/33
See application file for complete search history.

(56) References Cited

U.S. PATENT DOCUMENTS

| | | | | |
|---|---|---|---|---|
| 8,788,530 | B2* | 7/2014 | Lacapra | G06F 16/13 |
| | | | | 707/783 |
| 8,943,031 | B2* | 1/2015 | Karampuri | G06F 16/182 |
| | | | | 707/697 |
| 9,473,506 | B1* | 10/2016 | Hensley | H04L 63/0428 |
| 9,547,726 | B2* | 1/2017 | Ran | G06F 9/546 |
| 9,569,459 | B1* | 2/2017 | Strauss | G06F 16/182 |
| 9,575,986 | B2* | 2/2017 | Doig | G06F 16/1774 |
| 9,697,227 | B2* | 7/2017 | Aron | G06F 16/1767 |
| 10,169,367 | B2* | 1/2019 | Lin | G06F 16/1774 |
| 2005/0177750 | A1* | 8/2005 | Gasparini | G06F 21/31 |
| | | | | 726/5 |
| 2012/0102272 | A1* | 4/2012 | Rajaram | G06F 12/0891 |
| | | | | 711/141 |
| 2012/0265836 | A1 | 10/2012 | Nemoto et al. | |
| 2013/0074158 | A1* | 3/2013 | Koskimies | H04L 63/0428 |
| | | | | 726/4 |
| 2013/0166510 | A1* | 6/2013 | Augenstein | G06F 11/1453 |
| | | | | 707/640 |

FOREIGN PATENT DOCUMENTS

| | | |
|---|---|---|
| CN | 104331428 | 2/2015 |
| CN | 104376122 | 2/2015 |

OTHER PUBLICATIONS

Translation of International Search Report from corresponding PCT application No. PCT/CN2016/093493 dated Nov. 8, 2016, 2 pages.
Translation of Written Option from corresponding PCT application No. PCT/CN2016/093493 dated Nov. 8, 2016, 6 pages.

* cited by examiner

METHOD, APPARATUS, AND SYSTEM FOR READING AND WRITING FILES

CROSS REFERENCE TO RELATED PATENT APPLICATIONS

This application claims priority to and is a continuation of PCT Patent Application No. PCT/CN2016/093493, filed on 5 Aug. 2016, which claims priority to Chinese Patent Application No. 201510500501.0, filed on 14 Aug. 2015 and entitled "METHOD, APPARATUS, AND SYSTEM FOR READING AND WRITING FILES", which are incorporated herein by reference in their entirety.

TECHNICAL FIELD

The present disclosure relates to the technical field relating to allowing users to edit code on pages such as a web-based integrated development environment (Web IDE), which is a class of web pages that allow users to edit code on webpages, and, more particularly, to methods, apparatuses, and systems for reading and writing files.

BACKGROUND

As common file version control tools used in the development process, GIT (which is a distributed version control system) and SVN (Subversion, which is a version control system of open source code) are often employed in team development tasks. However, the two tools require developers to be highly familiar with systems, environments, and commands, resulting in low development efficiency when the tools are used.

At present, some Web IDE development environments (such as Coding.net in China) already allow developers to write and submit code files in a browser, to solve the problem of low efficiency caused by high operation costs. For example, some collaboratively developed systems employ a client terminal caching method. That is, developers record their operations on a same file in respective client terminal caches, and then submit the cached operations to a server. The server acquires the operations cached in the client terminals, integrates the operations into one complete operation, and then updates the file. However, this solution has the following problems:

(1) File read/write permission of the developers is not properly controlled. One file may be opened and edited in multiple browsers, or multiple developers may open a same file to write. Therefore, in some cases, different developers may open a same file at the same time and write different contents into the file. Thus, there may be conflicting contents in the file when different developers submit the edited files, or contents of the file may write over each other, which severely hinders the performance of the developers in collaborative development.

(2) The client terminal needs a cache, and sufficient permission is needed to operate a caching system. For example, the developers cannot carry out operations if the operation system such as the iOS system strictly controls user permissions or a user manually disables the permission.

(3) All modification contents of the file are saved in the client terminal. Data will be lost if a user switches the client terminal when the developer has already modified data but has not submitted the modified data to the server.

(4) All operation data is stored in the client terminal cache, and the developers may arbitrarily modify the cached data if they have the permission, resulting in poor security.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure is intended to solve one or more of the technical problems in the related technology to a certain degree.

An example embodiment according to the first aspect of the present disclosure provides a method for reading and writing files, which includes the following steps: receiving an access request, and acquiring file identifier information and first user identifier information according to the access request; querying a first server such as a cache server for a locked file corresponding to the file identifier information, and acquiring a first original file corresponding to the file identifier information from a second server such as a file server if the locked file corresponding to the file identifier information is not found; generating a locked file according to the first user identifier information and the first original file, and submitting the locked file to the cache server; receiving an editing operation for the first original file, and submitting the edited first original file to the first server such as the cache server, so that the cache server updates the locked file according to the edited first original file. The first server and the second server may be separate servers, integrated into one server, or the same server.

The method for reading and writing files according to the example embodiment of the present disclosure realizes a file locking mechanism applicable to a Web IDE system by using a cache server. The cache server is used as a buffer between a file server and a Web IDE server, and uses a caching mechanism to implement file locking. As such, a user may have an exclusive operation right of a file in the process of operating the file, thereby avoiding that users submit conflicting contents when operating the same file, so that the Web IDE system may play a more important role in multiple collaborative development processes. In addition, file locking implemented by using the caching mechanism is lower in costs than by modifying a database of the file server each time. Moreover, the caching mechanism may process multiple types of files more flexibly, generate different copies of a same file, and so on, thereby bringing better experience to users.

An example embodiment according to the second aspect of the present disclosure provides an apparatus for reading and writing files, which includes: a first receiving module configured to receive an access request; a first acquisition module configured to acquire file identifier information and first user identifier information according to the access request; a query module configured to query a first server such as a cache server for a locked file corresponding to the file identifier information; a second acquisition module configured to acquire a first original file corresponding to the file identifier information from a second server such as a file server if the query module does not find the locked file corresponding to the file identifier information; a generation module configured to generate a locked file according to the first user identifier information and the first original file; a submission module configured to submit the locked file to the cache server; and a second receiving module configured to receive an editing operation for the first original file, wherein the submission module submits the edited first original file to the cache server, so that the cache server updates the locked file according to the edited first original file. The first server and the second server may be separate servers, integrated into one server, or the same server.

The apparatus for reading and writing files according to the example embodiment of the present disclosure realizes a file locking mechanism applicable to a Web IDE system by using a cache server. The cache server is used as a buffer between a file server and a Web IDE server, and uses a caching mechanism to implement file locking. As such, a user may have an exclusive operation right of a file in the process of operating the file, avoiding that users submit conflicting contents when operating the same file, so that the Web IDE system may play a more important role in multiple collaborative development processes. In addition, file locking implemented by using the caching mechanism is lower in costs than by modifying a database of the file server each time. Moreover, the caching mechanism may process multiple types of files more flexibly, generate different copies of a same file, and so on, bringing better experience to users.

An example embodiment according to the third aspect of the present disclosure provides a system for reading and writing files, which includes: a first server such as a cache server, a second server such as a file server, and a third server such as a Web IDE server. The Web IDE server is configured to receive an access request, and acquire file identifier information and first user identifier information according to the access request; query the cache server for a locked file corresponding to the file identifier information, and acquire a first original file corresponding to the file identifier information from the file server if the locked file corresponding to the file identifier information is not found; generate a locked file according to the first user identifier information and the first original file, and submit the locked file to the cache server; and receive an editing operation for the first original file, and submit the edited first original file to the cache server. The cache server is configured to store the locked file, and update the locked file according to the edited first original file. The first server, the second server, and the third server may be separate servers, integrated into one server, or the same server.

The system for reading and writing files according to the example embodiment of the present disclosure realizes a file locking mechanism applicable to a Web IDE system by using a cache server. The cache server is used as a buffer between a file server and a Web IDE server, and uses a caching mechanism to implement file locking. As such, a user may have an exclusive operation right of a file in the process of operating the file, avoiding that users submit conflicting contents when operating the same file, so that the Web IDE system may play a more important role in multiple collaborative development processes. In addition, file locking implemented by using the caching mechanism is lower in costs than by modifying a database of the file server each time. Moreover, the caching mechanism may process multiple types of files more flexibly, generate different copies of a same file, and so on, bringing better experience to users.

BRIEF DESCRIPTION OF THE DRAWINGS

To illustrate the technical solutions in the example embodiments of the present disclosure clearly, the accompanying drawings for describing the example embodiments will be introduced briefly. Apparently, the accompanying drawings in the following description only represent some example embodiments of the present disclosure. Those of ordinary skill in the art may further obtain other drawings according to these accompanying drawings without creative efforts.

DETAILED DESCRIPTION

Figure 1:
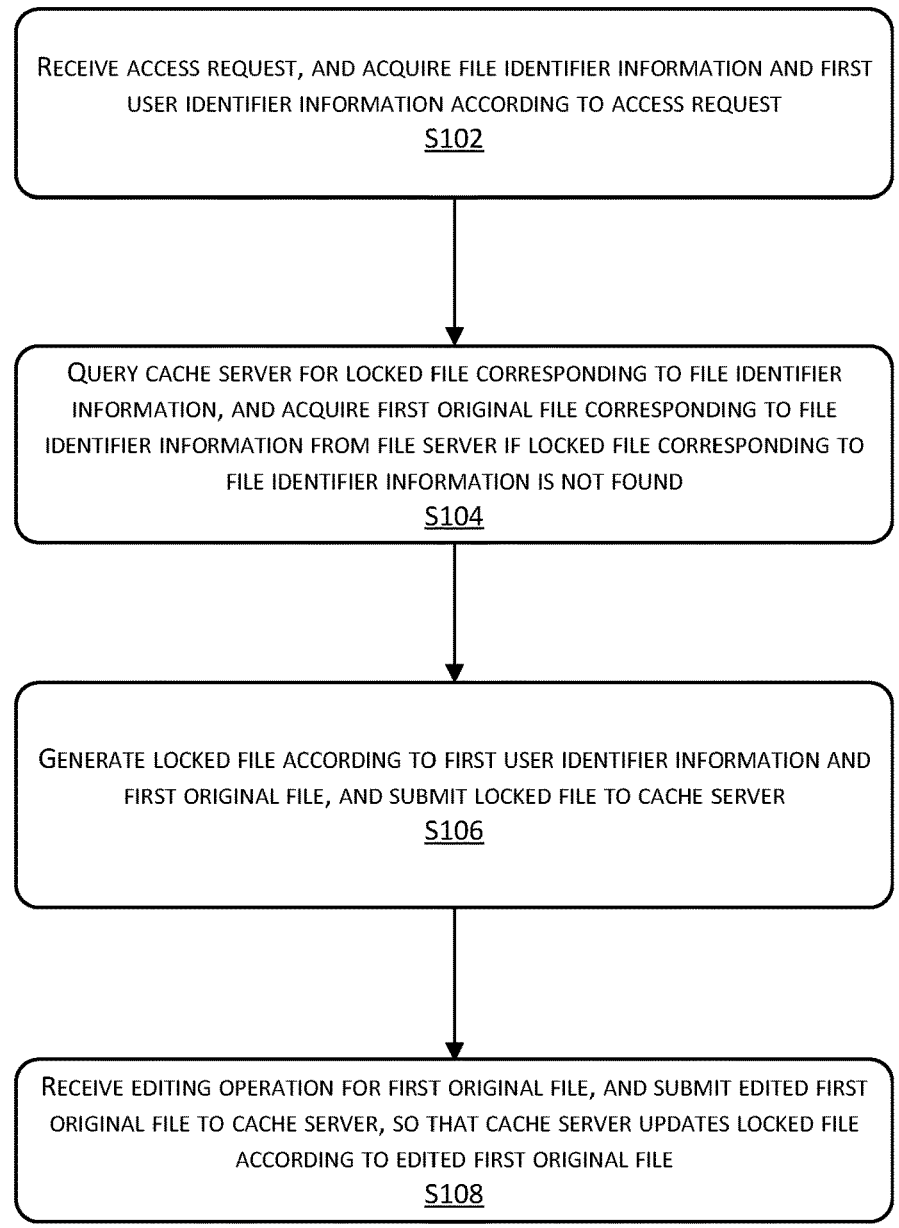
FIG. 1 is a flowchart of a method for reading and writing files according to an example embodiment of the present disclosure.

The example embodiments of the present disclosure are described in detail below with reference to the accompanying drawings, wherein identical or similar reference numerals represent identical or similar elements or elements having identical or similar functions. The example embodiments described below with reference to the accompanying drawings are exemplary and intended to illustrate the present disclosure, and should not be construed as limitations to the present disclosure.

In addition, the terms "first" and "second" are only used for description, but should not be construed as indicating or implying the relative importance or implicitly specifying the number of indicated technical features. Therefore, features defined by "first" and "second" may explicitly or implicitly include one or more said features. In the description of the present disclosure, the term "multiple" means two or more than two, unless otherwise specified.

Any process or method described in the flowchart or in other manners here may be construed as a module, segment or part representing code that includes one or more executable instructions for implementing an example logic function or process step. In addition, the scope of the example embodiments of the present disclosure includes other implementations, wherein the functions may be executed in a sequence different from the shown or discussed sequence, including executing the functions basically simultaneously or in a reverse order according to the related functions. This should be understood by persons skilled in the technical field to which the example embodiments of the present disclosure belong.

FIG. 1 is a flowchart of a method for reading and writing files according to an example embodiment of the present disclosure.

As shown in FIG. 1, the method for reading and writing files includes the following steps:

S102: An access request is received, and file identifier information and first user identifier information are acquired according to the access request.

The example embodiment of the present disclosure includes a Web IDE server, a cache server and a file server. The Web IDE server may provide a user interface for editing files, execute operations in the cache server, or interact with the cache server and the file server. The file server is used for storing a code file of a file. For example, a GIT server is used for storing code files of GIT files, and an SVN server is used for storing code files of SVN files. The cache server may store locked files by using a caching mechanism. For example, the cache server may be a noSql cache server, or may be Redis, Tair cache server, or another cache server.

The Web IDE server, cache server and file server each may be a single server, or a server cluster consisting of multiple servers.

For example, the Web IDE server may receive an access request sent by user A for accessing a particular file, and acquire file identifier information of the file as well as user identifier information of user A. Here, the file identifier information is a unique identifier for querying the file on a server end. For example, the file identifier information may be a file path, a Message Digest Algorithm 5 (MD5) of the file, or the like. The user identifier information is a unique identifier for verifying user identity. For example, the user identifier information may be a user ID (identity number), or the like.

S104: A cache server is queried for a locked file corresponding to the file identifier information, and a first original file corresponding to the file identifier information is acquired from a file server if the locked file corresponding to the file identifier information is not found.

For example, the Web IDE server may query whether a file corresponding to the file identifier information exists in the cache server according to the file identifier information, wherein the file is in a locked state in the cache server, i.e., the file is a locked file. In other words, user A does not directly acquire the file from the file server when requesting access to the file; instead, user A may first query whether the locked file already exists in the cache server, and then acquire the file from the file server if the locked file does not exist in the cache server.

If the Web IDE server does not find the corresponding locked file in the cache server, it may indicate that an original file stored in the file server is currently in an unlocked state, and user A has the right to acquire the original file from the file server and lock the original file. Therefore, the Web IDE server may find the corresponding original file in the file server according to the file identifier information and acquire the original file.

S106: A locked file is generated according to the first user identifier information and the first original file, and is submitted to the cache server.

For example, the Web IDE server may present file contents of the original file to user A, and meanwhile lock the original file according to the user identifier information of user A, to generate a locked file including the original file and the user identifier information. Then, the Web IDE server may use the file identifier information as an identifier of the locked file, and submit the locked file to the cache server for storage.

If the Web IDE server receives a request sent by user B for access to the file after the locked file is stored in the cache server, similarly, the Web IDE server may also first query whether a locked file corresponding to the file exists in the cache server in the same way. If the Web IDE server finds the corresponding locked file, user B is not allowed to acquire the locked file or edit the locked file because the locked file exists in the cache server. Therefore, user A and user B are prevented from editing the file at the same time, so that the problem of conflicting edited contents may be avoided.

S108: An editing operation for the first original file is received, and the edited first original file is submitted to the cache server, so that the cache server updates the locked file according to the edited first original file.

For example, user A may edit the file contents of the original file. When user A chooses to save the edited contents, the Web IDE server may submit the edited original file added with the user identifier information to the cache server. In other words, the Web IDE server may save the contents edited by user A into the locked file in the cache server.

The Web IDE server may employ methods in the prior art to read a file from or write a file to the file server and present file contents to the user. For example, the Web IDE server may use a GitLab API or Svn API to implement file reading and writing, and use an open-source JS frame such as ACE to present file contents. Solid State Drives (SSDs) may be used for the cache in the cache server to achieve a cache-persistence space, so that a larger storage space may be obtained; alternatively, a Tair cluster and other caching solutions are also available. The solutions above are all mature technologies, and therefore are not described here again.

The method for reading and writing files according to the example embodiment of the present disclosure realizes a file locking mechanism applicable to a Web IDE system by using a cache server. The cache server is used as a buffer between a file server and a Web IDE server, and uses a caching mechanism to implement file locking. As such, a user may have an exclusive operation right of a file in the process of operating the file, avoiding that users submit conflicting contents when operating the same file, so that the Web IDE system may play a more important role in multiple collaborative development processes. In addition, file locking implemented by using the caching mechanism is lower in costs than by modifying a database of the file server each time. Moreover, the caching mechanism may process multiple types of files more flexibly, generate different copies of a same file, and so on, bringing better experience to users.

Figure 2:
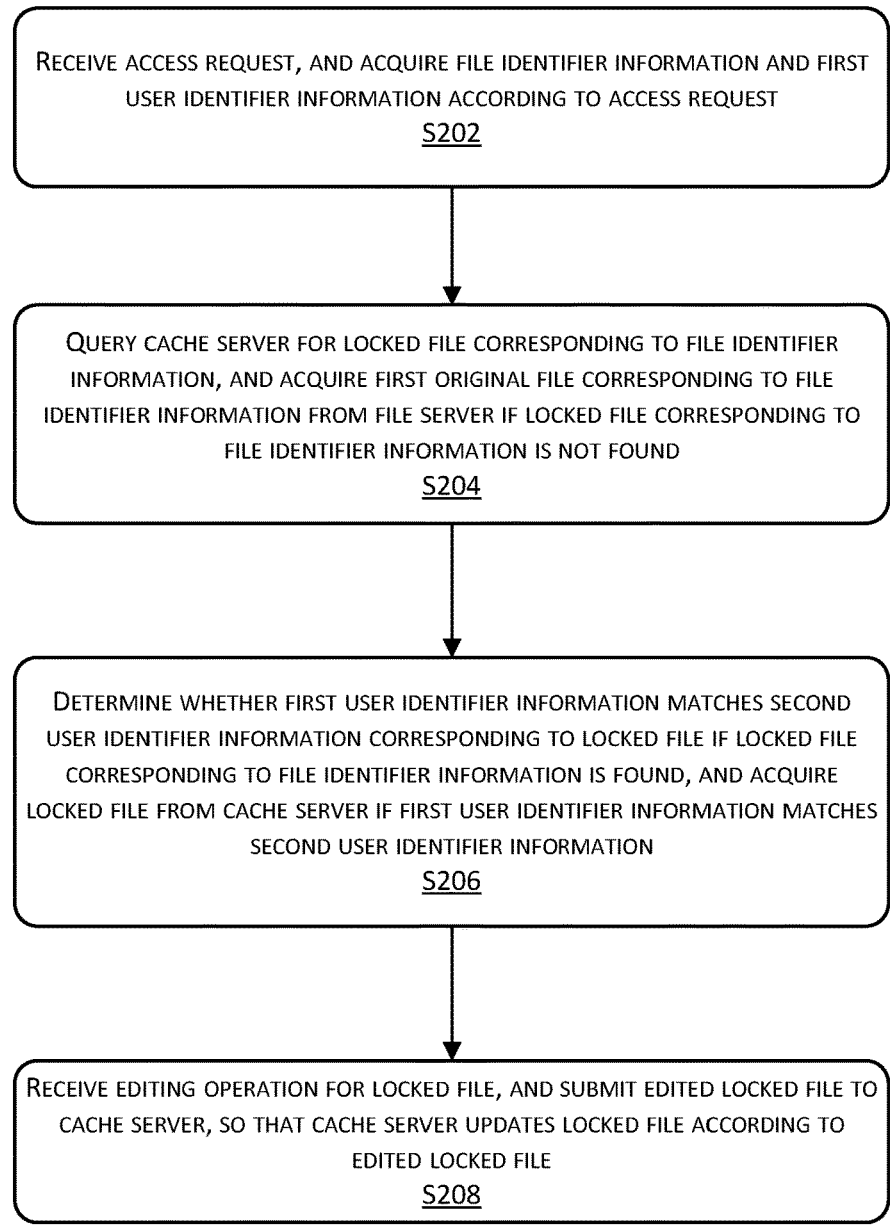
FIG. 2 is a flowchart of a method for reading and writing files according to another example embodiment of the present disclosure.

FIG. 2 is a flowchart of a method for reading and writing files according to an example embodiment of the present disclosure.

As shown in FIG. 2, the method for reading and writing files includes the following steps:

S202: An access request is received, and file identifier information and first user identifier information are acquired according to the access request.

S204: A cache server is queried for a locked file corresponding to the file identifier information, and a first original file corresponding to the file identifier information is acquired from a file server if the locked file corresponding to the file identifier information is not found.

S206: Whether the first user identifier information matches second user identifier information corresponding to the locked file is determined, if the locked file corresponding to the file identifier information is found, and the locked file is acquired from the cache server if the first user identifier information matches the second user identifier information.

For example, if the Web IDE server finds the corresponding locked file in the cache server, it may indicate that the original file stored in the file server is currently in a locked state. In this case, the Web IDE server may acquire user identifier information of the locked file, and determine whether user identifier information of user A matches the user identifier information of the locked file. If the user identifier information of user A matches the user identifier information of the locked file, the Web IDE server determines that user A has the right to acquire and edit the locked file.

The locked file may still be in the locked state in the cache server after user A reads the locked file.

In an example embodiment of the present disclosure, if the first user identifier information does not match the second user identifier information, prompt information of refusing to acquire the locked file may be generated. For example, if user B accesses the locked file in the cache server, user identifier information of user B does not match the user identifier information of the locked file. That is, the locked file is locked by user A, and in this case, the Web IDE server may determine that user B does not have the right to acquire and edit the locked file, and generate prompt information to prompt user B.

In an example embodiment of the present disclosure, if the Web IDE server determines that user B does not have the right to acquire and edit the locked file, the Web IDE server may provide a copy of the locked file to user B. User B may edit the copy, so that after user A unlocks the locked file, the Web IDE server may submit the locked file after processing conflict between the copy edited by user B and the locked file edited by user A. Therefore, a friendlier operation mode may be provided for user B when user B does not have the right to edit the locked file.

S208: An editing operation for the locked file is received, and the edited locked file is submitted to the cache server, so that the cache server updates the locked file according to the edited locked file.

For example, the Web IDE server may present file contents of the locked file to user A, and user A may edit the file contents. When user A chooses to save the edited contents, the Web IDE server may submit the edited locked file added with the user identifier information to the cache server. In other words, the Web IDE server may save the contents edited by user A into the locked file in the cache server.

Since files cached in the cache server are persistent, the locked file stored by user A in the cache server will be kept persistently. When user A switches from one client terminal to another client terminal, the locked file in the cache server may be read again for editing according to the user identifier information of user A and the file identifier information.

Figure 3:
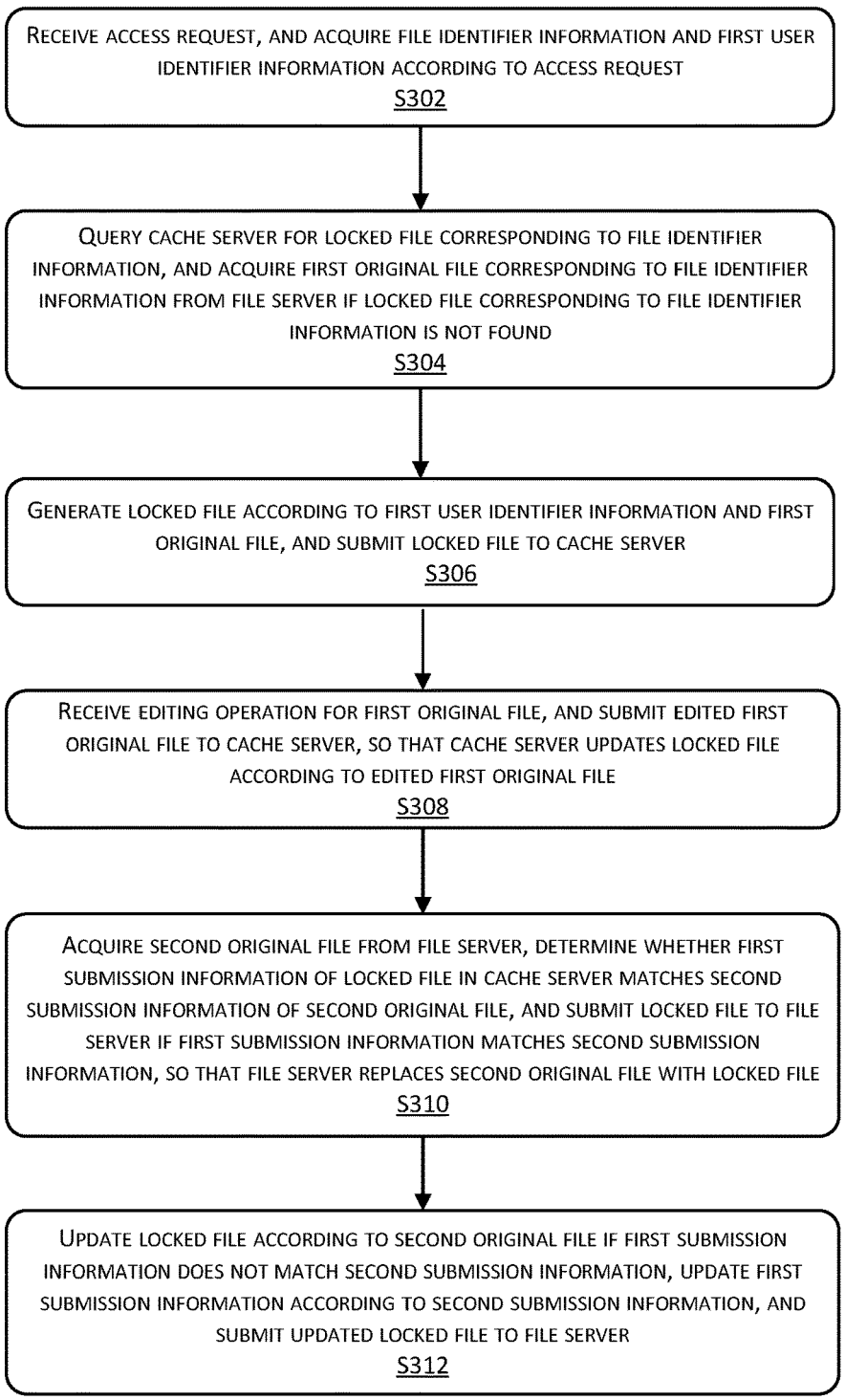
FIG. 3 is a flowchart of a method for reading and writing files according to another example embodiment of the present disclosure.

FIG. 3 is a flowchart of a method for reading and writing files according to another example embodiment of the present disclosure.

As shown in FIG. 3, the method for reading and writing files includes the following steps:

S302: An access request is received, and file identifier information and first user identifier information are acquired according to the access request.

S304: A cache server is queried for a locked file corresponding to the file identifier information, and a first original file corresponding to the file identifier information is acquired from a file server if the locked file corresponding to the file identifier information is not found.

S306: A locked file is generated according to the first user identifier information and the first original file, and is submitted to the cache server.

S308: An editing operation for the first original file is received, and the edited first original file is submitted to the cache server, so that the cache server updates the locked file according to the edited first original file.

S310: A second original file is acquired from the file server, and whether first submission information of the locked file in the cache server matches second submission information of the second original file is determined. The locked file is submitted to the file server if the first submission information matches the second submission information, so that the file server replaces the second original file with the locked file.

For example, the Web IDE server may acquire again the original file saved in the file server after updating the locked file in the cache server according to contents edited by user A, and acquire submission information of the original file. If submission information of the locked file in the cache server matches the submission information of the original file in the file server, the Web IDE server may asynchronously submit the updated locked file to the file server, and replace the original file in the file server with the updated locked file.

S312: The locked file is updated according to the second original file if the first submission information does not match the second submission information, the first submission information is updated according to the second submission information, and the updated locked file is submitted to the file server.

For example, if the submission information of the locked file in the cache server does not match the submission information of the original file in the file server, it may indicate that the original file in the file server has been updated. For example, a user has updated the original file by using a client terminal of the file server. In this case, the Web IDE server may save the contents of the locked file as a copy, acquire the contents of the original file, and update the contents of the locked file according to the contents of the original file. After user A resolves the conflict between the contents of the locked file and the contents of the original file, the Web IDE server may update the submission information of the locked file in the cache server with the submission information of the original file in the file server. Then, the Web IDE server may asynchronously submit the updated locked file to the file server, to replace the original file in the file server with the updated locked file.

Figure 4:
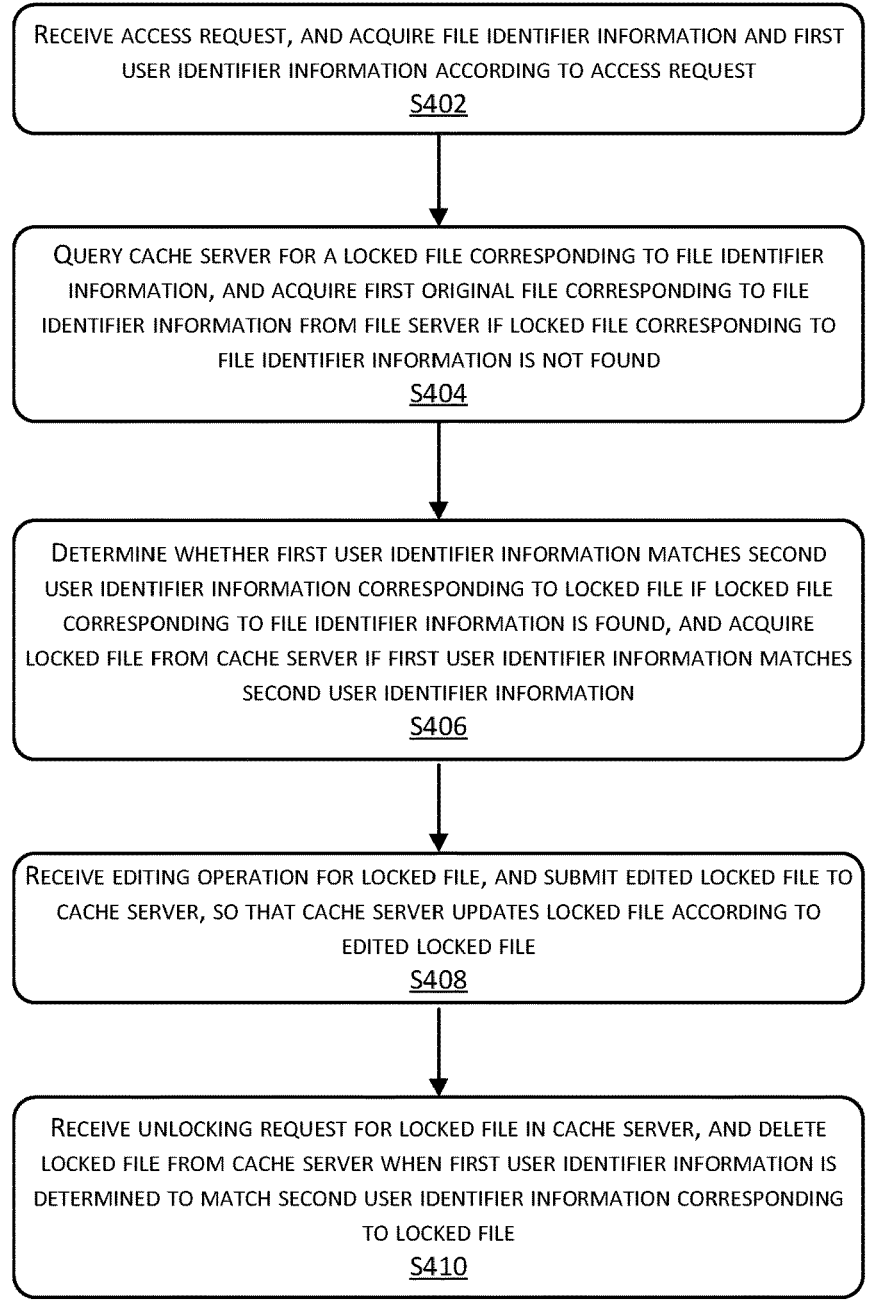
FIG. 4 is a flowchart of a method for reading and writing files according to another example embodiment of the present disclosure.

FIG. 4 is a flowchart of a method for reading and writing files according to another example embodiment of the present disclosure.

As shown in FIG. 4, the method for reading and writing files includes the following steps:

S402: An access request is received, and file identifier information and first user identifier information are acquired according to the access request.

S404: A cache server is queried for a locked file corresponding to the file identifier information, and a first original file corresponding to the file identifier information is acquired from a file server if the locked file corresponding to the file identifier information is not found.

S406: Whether the first user identifier information matches second user identifier information corresponding to the locked file is determined, if the locked file corresponding to the file identifier information is found, and the locked file is acquired from the cache server if the first user identifier information matches the second user identifier information.

S408: An editing operation for the locked file is received, and the edited locked file is submitted to the cache server, so that the cache server updates the locked file according to the edited locked file.

S410: An unlocking request for the locked file in the cache server is received, and the locked file is deleted from the cache server when the first user identifier information is determined to match the second user identifier information corresponding to the locked file.

For example, user A may send an unlocking request for the locked file after finishing editing the locked file. After receiving the unlocking request sent by user A, the Web IDE server may prompt the user that the locked file is going to be unlocked and prompt the user whether to submit the locked file to the file server before unlocking. The corresponding locked file is searched for in the cache server according to the file identifier information after user A confirms to unlock the locked file, and it is determined whether user identifier information corresponding to the locked file matches user identifier information of user A. The Web IDE server may delete the locked file from the cache server if the user identifier information corresponding to the locked file matches the user identifier information of user A.

If user B requests access to the file after the locked file is deleted from the cache server, the Web IDE server may further provide user B with an exclusive operation right of operating the file according to steps S402 to S408.

Figure 5:
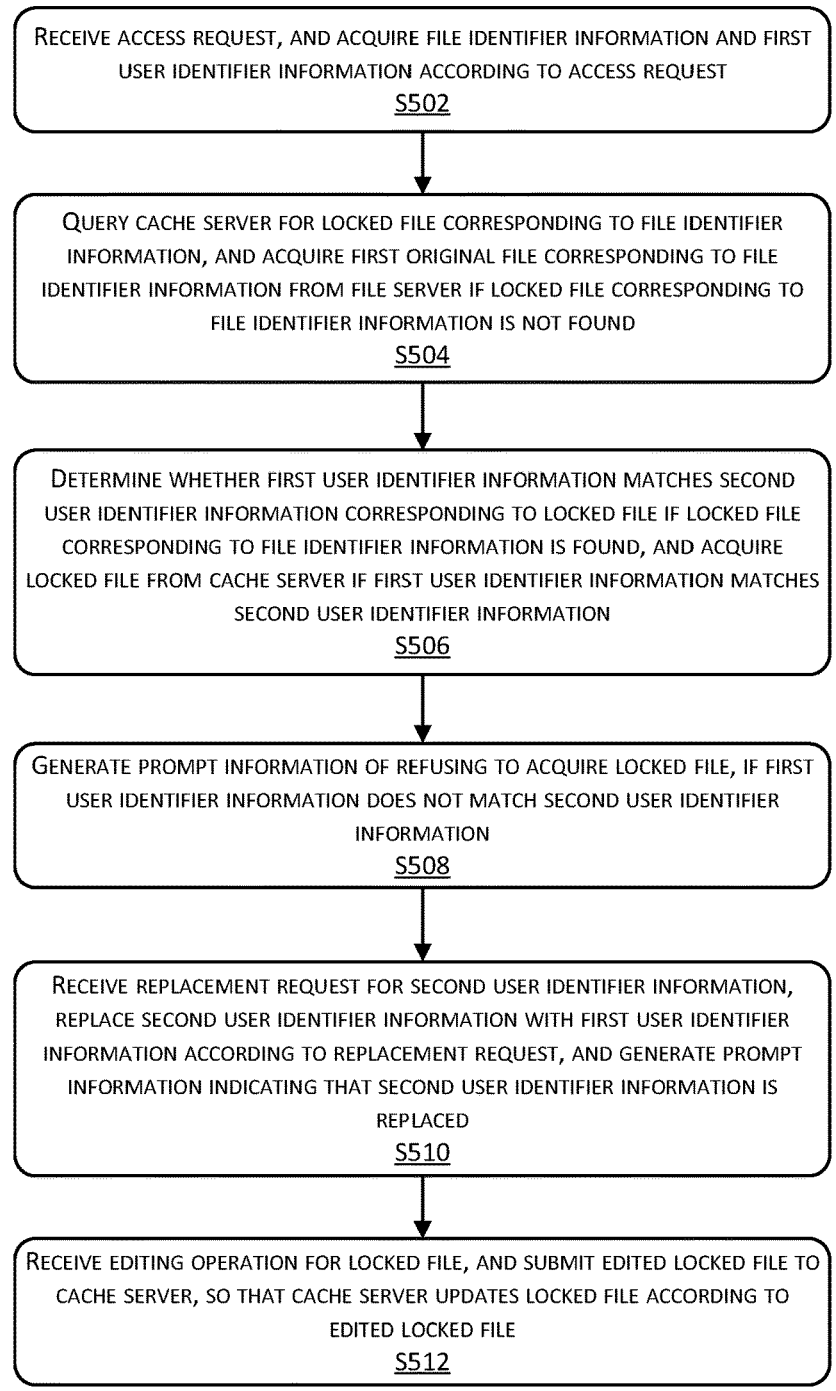
FIG. 5 is a flowchart of a method for reading and writing files according to another example embodiment of the present disclosure.

FIG. 5 is a flowchart of a method for reading and writing files according to another example embodiment of the present disclosure.

As shown in FIG. 5, the method for reading and writing files includes the following steps:

S502: An access request is received, and file identifier information and first user identifier information are acquired according to the access request S504: A cache server is queried for a locked file corresponding to the file identifier information, and a first original file corresponding to the file identifier information is acquired from a file server if the locked file corresponding to the file identifier information is not found.

S506: Whether the first user identifier information matches second user identifier information corresponding to the locked file is determined, if the locked file corresponding to the file identifier information is found. The locked file is acquired from the cache server if the first user identifier information matches the second user identifier information.

S508: Prompt information of refusing to acquire the locked file is generated if the first user identifier information does not match the second user identifier information.

S510: A replacement request for the second user identifier information is received, the second user identifier information is replaced with the first user identifier information according to the replacement request, and prompt information indicating that the second user identifier information is replaced is generated.

For example, if user B does not have the right to acquire and edit the locked file which is locked by user A but urgently needs to edit the locked file, user B may choose to contend for the lock, to directly take the read/write permission of the locked file from user A. In other words, user B may send a replacement request for user identifier information corresponding to the locked file in the cache server. After receiving the replacement request sent by user B, the Web IDE server may replace the user identifier information of the locked file with user identifier information of user B, and generate prompt information indicating that the user identifier information of the locked file is replaced, to prompt user A.

S512: An editing operation for the locked file is received, and the edited locked file is submitted to the cache server, so that the cache server updates the locked file according to the edited locked file.

For example, the Web IDE server may present file contents of the locked file to user B, and user B may edit the file contents. When user B chooses to save edited contents, the Web IDE server may submit the edited locked file added with the user identifier information of user B to the cache server. In other words, the Web IDE server may save the contents edited by user B into the locked file in the cache server.

The method for reading and writing files in the example embodiment of the present disclosure provides users with functions such as file locking, file unlocking and lock contention, and solves problems that contents submitted during collaborative development conflict each other and write over each other. Meanwhile, a cache server is used to save a locked file, so that the problem of asynchronous information in multiple Web IDE servers may be solved. As such, it is possible to give full play to the advantages of high speed and being not limited by environments during collaborative development.

To implement the foregoing example embodiments, the present disclosure further provides an apparatus for reading and writing files.

Figure 6:
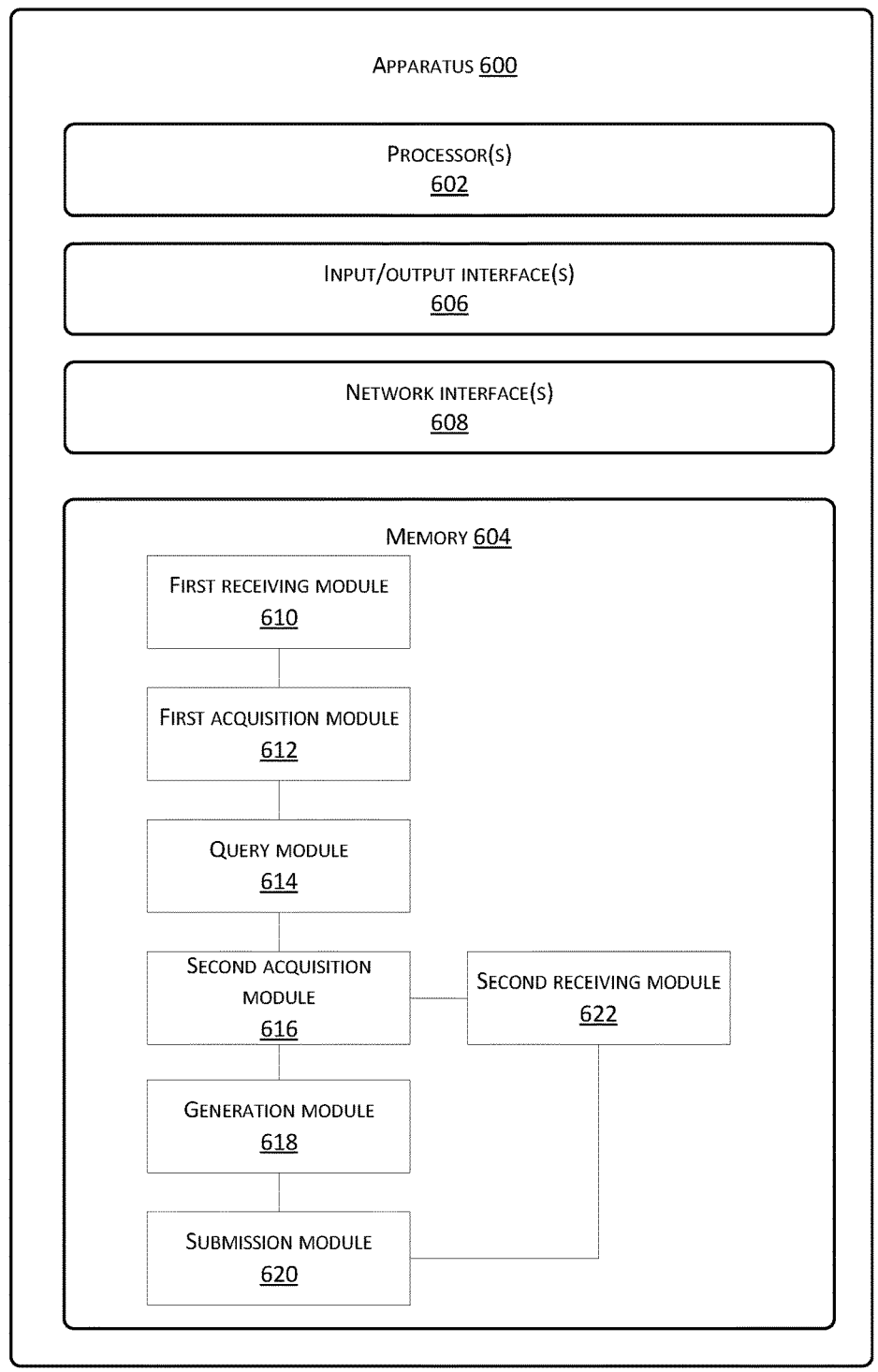
FIG. 6 is a schematic structural diagram of an apparatus for reading and writing files according to an example embodiment of the present disclosure.

FIG. 6 is a schematic structural diagram of an apparatus for reading and writing files 600 according to an example embodiment of the present disclosure. As shown in FIG. 6, the apparatus 600 for reading and writing files includes one or more processor(s) 602 or data processing unit(s) and memory 604. The apparatus 600 may further include one or more input/output interface(s) 606 and one or more network interface(s) 608. The memory 604 is an example of computer readable media.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include non-transitory transitory media such as modulated data signals and carriers.

The memory 604 may store therein a plurality of modules or units including a first receiving module 610, a first acquisition module 612, a query module 614, a second acquisition module 616, a generation module 618, a submission module 620, and a second receiving module 622.

For example, the first receiving module 610 is configured to receive an access request. The first acquisition module 612 is configured to acquire file identifier information and first user identifier information according to the access request. For example, the first receiving module 610 may receive an access request sent by user A for accessing a particular file, and the first acquisition module 612 may acquire file identifier information of the file and user identifier information of user A. Here, the file identifier information is a unique identifier for querying the file on a server end. For example, the file identifier information may be a file path, an MD5 of the file, or the like. The user identifier information is a unique identifier for verifying user identity. For example, the user identifier information may be a user ID, or the like.

The query module 614 is configured to query a cache server for a locked file corresponding to the file identifier information. The second acquisition module 616 is configured to acquire a first original file corresponding to the file identifier information from a file server if the query module 614 does not find the locked file corresponding to the file identifier information. For example, the query module 614 may query whether a file corresponding to the file identifier information exists in the cache server according to the file identifier information, wherein the file is in a locked state in the cache server, i.e., the file is a locked file. In other words, user A does not directly acquire the file from the file server when requesting access to the file; instead, user A may first query whether the locked file already exists in the cache server, and then acquire the file from the file server if the locked file does not exist in the cache server. If the query module 614 does not find the corresponding locked file in the cache server, it may indicate that an original file stored in the file server is currently in an unlocked state, and user A has the right to acquire the original file from the file server and lock the original file. Therefore, the second acquisition module 616 may find the original file in the file server according to the file identifier information and acquire the original file.

The generation module 618 is configured to generate a locked file according to the first user identifier information and the first original file. The submission module 620 is configured to submit the locked file to the cache server. For example, the generation module 618 may present file contents of the original file to user A. Meanwhile, the generation module 618 may lock the original file according to the user identifier information of user A, to generate a locked file including the original file and the user identifier information. Then, the submission module 620 may use the file identifier information as an identifier of the locked file, and submit the locked file to the cache server for storage.

The second receiving module 622 is configured to receive an editing operation for the first original file, wherein the submission module 620 submits the edited first original file to the cache server, so that the cache server updates the locked file according to the edited first original file. For example, user A may edit the file contents of the original file. When user A chooses to save the edited contents, the second receiving module 622 may receive the editing operation of the user, and the submission module 620 may submit the edited original file added with the user identifier information to the cache server. In other words, the contents edited by user A may be saved into the locked file in the cache server.

The apparatus for reading and writing files according to the example embodiment of the present disclosure realizes a file locking mechanism applicable to a Web IDE system by using a cache server. The cache server is used as a buffer between a file server and a Web IDE server, and uses a caching mechanism to implement file locking. As such, a user may have an exclusive operation right of a file in the process of operating the file, avoiding that users submit conflicting contents when operating the same file, so that the Web IDE system may play a more important role in multiple collaborative development processes. In addition, file locking implemented by using the caching mechanism is lower in costs than by modifying a database of the file server each time. Moreover, the caching mechanism may process multiple types of files more flexibly, generate different copies of a same file, and so on, bringing better experience to users.

Figure 7:
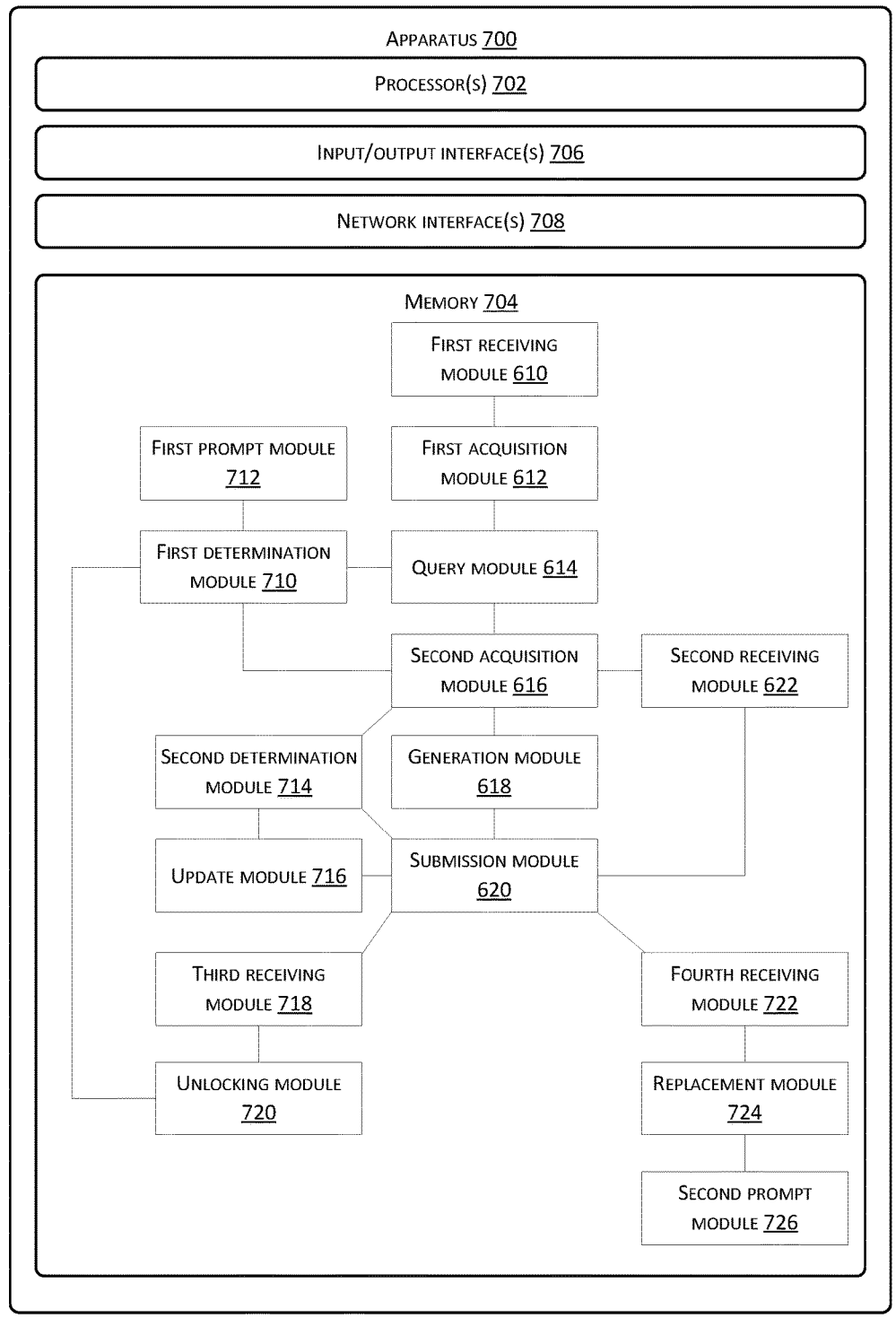
FIG. 7 is a schematic structural diagram of an apparatus for reading and writing files according to another example embodiment of the present disclosure.

FIG. 7 is a schematic structural diagram of an apparatus 700 for reading and writing files according to an example embodiment of the present disclosure. As shown in FIG. 7, the apparatus 700 for reading and writing files includes one or more processor(s) 702 or data processing unit(s) and memory 704. The apparatus 700 may further include one or more input/output interface(s) 706 and one or more network interface(s) 708. The memory 704 is an example of computer readable media.

The memory 704 may store therein a plurality of modules or units including a first receiving module 610, a first acquisition module 612, a query module 614, a second acquisition module 616, a generation module 618, a submission module 620, and a second receiving module 622, a first determination module 710, a first prompt module 712, a second determination module 714, an update module 716, a third receiving module 718, an unlocking module 720, a fourth receiving module 722, a replacement module 724, and a second prompt module 726.

For example, the first determination module 710 is configured to determine whether the first user identifier information matches second user identifier information corresponding to the locked file when the query module 614 finds the locked file corresponding to the file identifier information. The second acquisition module 616 is further configured to acquire the locked file from the cache server when the first determination module 710 determines that the first user identifier information matches the second user identifier information. For example, if the query module 614 finds the corresponding locked file in the cache server, it may indicate that the original file stored in the file server is currently in a locked state. In this case, user identifier information of the locked file may be acquired, and the first determination module 710 may determine whether user identifier information of user A matches the user identifier information of the locked file. If the first determination module 710 determines that the user identifier information of user A matches the user identifier information of the locked file, user A has the right to acquire and edit the locked file. Therefore, the second acquisition module 616 may acquire the locked file from the cache server.

The first prompt module 712 is configured to generate prompt information of refusing to acquire the locked file, when the first determination module 710 determines that the first user identifier information does not match the second user identifier information. For example, if user B accesses the locked file in the cache server, the first determination module 710 may determine that user identifier information of user B does not match the user identifier information of the locked file. That is, the locked file is locked by user A; in this case, the first determination module 710 may determine that user B does not have the right to acquire and edit the locked file, and the first prompt module 712 may generate prompt information to prompt user B.

In an example embodiment of the present disclosure, the apparatus 700 for reading and writing files further includes the second determination module 714 and the update module 716 stored on the memory 704. The second acquisition module 616 is further configured to acquire a second original file from the file server. The second determination module 714 is configured to determine whether first submission information of the locked file in the cache server matches second submission information of the second original file. The submission module 620 is further configured to submit the locked file to the file server when the second determination module 714 determines that the first submission information matches the second submission information, so that the file server replaces the second original file with the locked file. For example, the second acquisition module 616 may acquire again the original file saved in the file server after the submission module 620 updates the locked file in the cache server according to contents edited by user A, and acquire submission information of the original file. If the second determination module 714 determines that submission information of the locked file in the cache server matches the submission information of the original file in the file server, the submission module 620 may asynchronously submit the updated locked file to the file server, and replace the original file in the file server with the updated locked file.

The update module 716 is configured to update the locked file according to the second original file when the second determination module 714 determines that the first submission information does not match the second submission information, and update the first submission information according to the second submission information, wherein the submission module 620 is further configured to submit the updated locked file to the file server. For example, if the second determination module 714 determines that the submission information of the locked file in the cache server does not match the submission information of the original file in the file server, it may indicate that the original file in the file server has been updated. For example, a user has updated the original file by using a client terminal of the file server. In this case, the update module 716 may save the contents of the locked file as a copy, acquire the contents of the original file, and update the contents of the locked file according to the contents of the original file. After user A resolves the conflict between the contents of the locked file and the contents of the original file, the submission module 620 may update the submission information of the locked file in the cache server with the submission information of the original file in the file server. Then, the submission module 620 may asynchronously submit the updated locked file to the file server, to replace the original file in the file server with the updated locked file.

In an example embodiment of the present disclosure, the apparatus 700 for reading and writing files further includes the third receiving module 718 and the unlocking module 720 stored on the memory 704. The third receiving module 718 is configured to receive an unlocking request for the locked file in the cache server. The unlocking module 720 is configured to delete the locked file from the cache server when the first determination module 710 determines that the first user identifier information matches the second user identifier information corresponding to the locked file. For example, user A may send an unlocking request for the locked file after finishing editing the locked file. After receiving the unlocking request sent by user A, the third receiving module 718 may prompt the user that the locked file is going to be unlocked and prompt the user whether to submit the locked file to the file server before unlocking. The first determination module 710 may search for the corresponding locked file in the cache server according to the file identifier information after user A confirms to unlock the locked file, and determine whether user identifier information corresponding to the locked file matches user identifier information of user A. The unlocking module 720 may delete the locked file from the cache server if the first determination module 710 determines that the user identifier information corresponding to the locked file matches the user identifier information of user A.

In an example embodiment of the present disclosure, the apparatus 700 for reading and writing files further includes the fourth receiving module 722, the replacement module 724 and the second prompt module 726 stored on the memory 704. Here, the fourth receiving module 722 is configured to receive a replacement request for the second user identifier information. The replacement module 724 is configured to replace the second user identifier information with the first user identifier information according to the replacement request. The second prompt module 726 is configured to generate prompt information indicating that the second user identifier information is replaced. For example, if user B does not have the right to acquire and edit the locked file which is locked by user A but urgently needs to edit the locked file, user B may choose to contend for the lock, to directly take the read/write permission of the locked file from user A. In other words, user B may send a replacement request for user identifier information corresponding to the locked file in the cache server. After the fourth receiving module 722 receives the replacement request sent by user B, the replacement module 724 may replace the user identifier information of the locked file with user identifier information of user B, and the second prompt module 726 may generate prompt information indicating that the user identifier information of the locked file is replaced, to prompt user A.

The apparatus for reading and writing files in the example embodiment of the present disclosure provides users with functions such as file locking, file unlocking and lock contention, and solves problems that contents submitted during collaborative development conflict each other and write over each other. Meanwhile, a cache server is used to save a locked file, so that the problem of asynchronous information in multiple Web IDE servers may be solved. As such, it is possible to give full play to the advantages of high speed and being not limited by environments during collaborative development.

To implement the foregoing example embodiments, the present disclosure further provides a system for reading and writing files.

Figure 8:
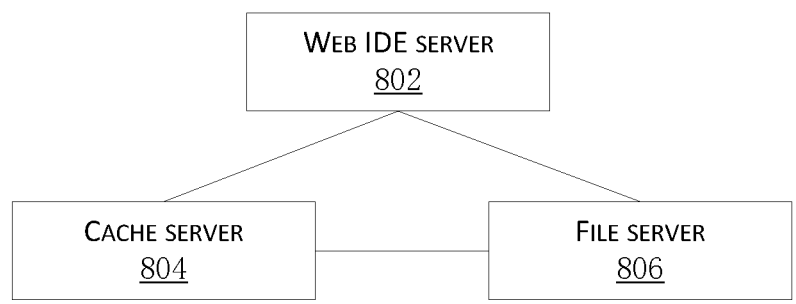
FIG. 8 is a schematic structural diagram of a system for reading and writing files according to another example embodiment of the present disclosure.

FIG. 8 is a schematic structural diagram of an apparatus for reading and writing files according to an example embodiment of the present disclosure. As shown in FIG. 8, the system for reading and writing files includes: a Web IDE server 802, a cache server 804, and a file server 806.

For example, the Web IDE server 802 is configured to receive an access request, and acquire file identifier information and first user identifier information according to the access request; query the cache server 804 for a locked file corresponding to the file identifier information, and acquire a first original file corresponding to the file identifier information from the file server 806 if the locked file corresponding to the file identifier information is not found; generate a locked file according to the first user identifier information and the first original file, and submit the locked file to the cache server 804; and receive an editing operation for the first original file, and submit the edited first original file to the cache server 804; and the cache server 804 is configured to store the locked file, and update the locked file according to the edited first original file.

In an example embodiment of the present disclosure, the Web IDE server 802 is further configured to determine whether the first user identifier information matches second user identifier information corresponding to the locked file when the locked file corresponding to the file identifier information is found, and acquire the locked file from the cache server 804 if the first user identifier information matches the second user identifier information.

In an example embodiment of the present disclosure, the Web IDE server 802 is further configured to generate prompt information of refusing to acquire the locked file, when the first user identifier information does not match the second user identifier information.

In an example embodiment of the present disclosure, the file server 806 stores a second original file, wherein the second original file is an updated version of the first original file. The Web IDE server 802 is further configured to acquire the second original file from the file server 806, determine whether first submission information of the locked file in the cache server 804 matches second submission information of the second original file, and submit the locked file to the file server 806 when the first submission information matches the second submission information. The file server 806 is further configured to replace the second original file with the locked file.

In an example embodiment of the present disclosure, the Web IDE server 802 is further configured to update the locked file according to the second original file when the first submission information does not match the second submission information, update the first submission information according to the second submission information, and submit the updated locked file to the file server 806. The file server 806 is further configured to replace the second original file with the updated locked file.

In an example embodiment of the present disclosure, the Web IDE server 802 is further configured to receive an unlocking request for the locked file in the cache server 804, and delete the locked file from the cache server 804 when it is determined that the first user identifier information matches the second user identifier information corresponding to the locked file.

In an example embodiment of the present disclosure, the Web IDE server 802 is further configured to receive a replacement request for the second user identifier information, replace the second user identifier information with the first user identifier information according to the replacement request, and generate prompt information indicating that the second user identifier information is replaced.

In addition, for the implementation and effects of the system for reading and writing files according to this example embodiment of the present disclosure, reference may be made to the implementations of the method for reading and writing files and the apparatus for reading and writing files in the foregoing example embodiments. Details are not described here again to reduce redundancy.

The system for reading and writing files according to the example embodiment of the present disclosure realizes a file locking mechanism applicable to a Web IDE system by using a cache server. The cache server is used as a buffer between a file server and a Web IDE server, and uses a caching mechanism to implement file locking. As such, a user may have an exclusive operation right of a file in the process of operating the file, avoiding that users submit conflicting contents when operating the same file, so that the Web IDE system may play a more important role in multiple collaborative development processes. In addition, file locking implemented by using the caching mechanism is lower in costs than by modifying a database of the file server each time. Moreover, the caching mechanism may process multiple types of files more flexibly, generate different copies of a same file, and so on, bringing better experience to users.

Thus, the system for reading and writing files in the example embodiment of the present disclosure provides users with functions such as file locking, file unlocking and lock contention, and solves problems that contents submitted during collaborative development conflict each other and write over each other. Meanwhile, a cache server is used to save a locked file, so that the problem of asynchronous information in multiple Web IDE servers may be solved. As such, it is possible to give full play to the advantages of high speed and being not limited by environments during collaborative development.

Each part of the present disclosure may be implemented by using hardware, software, firmware, or a combination of them. In the implementations above, multiple steps or methods may be implemented by software or firmware which is stored in a memory and executed by an appropriate instruction execution system. For example, if implemented by hardware, similar to another implementation, the steps or methods may be implemented by any one of or a combination of the following techniques commonly known in the art: a discrete logic circuit having a logic gate circuit for implementing a logic function for data signals, an application-specific integrated circuit having an appropriate combinational logic gate circuit, a programmable gate array (PGA), a field programmable gate array (FPGA), and the like.

In the description of the present specification, the description made with reference to terms such as "an example embodiment", "some example embodiments", "example", "specific examples", or "some examples" means that specific features, structures, materials, or characteristics described with reference to the example embodiment or example are included in at least one example embodiment or example of the present disclosure. In the present specification, the illustrative expression of the foregoing terms does not necessarily used for the same example embodiment or example. Moreover, the described specific features, structures, materials, or characteristics may be combined appropriately in any one or more example embodiments or examples. In addition, without causing contradictions, those skilled in the art may integrate and combine different example embodiments or examples described in the present specification and features of different example embodiments or examples.

Although the example embodiments of the present disclosure have been shown and described above, the foregoing example embodiments are exemplary and cannot be construed as any limitation to the present disclosure. Those of ordinary skill in the art may make changes, modifications, replacements and variations to the foregoing example embodiments without departing from the scope of the present disclosure.

The present disclosure may further be understood with clauses as follows.

Clause 1. A method for reading and writing files comprising:

receiving an access request, and acquiring file identifier information and first user identifier information according to the access request;

querying a cache server for a locked file corresponding to the file identifier information, and acquiring a first original file corresponding to the file identifier information from a file server if the locked file corresponding to the file identifier information is not found;

generating a locked file according to the first user identifier information and the first original file, and submitting the locked file to the cache server; and receiving an editing operation for the first original file, and submitting the edited first original file to the cache server, so that the cache server updates the locked file according to the edited first original file.

Clause 2. The method for reading and writing files of clause 1, after the step of querying a cache server for a locked file corresponding to the file identifier information, further comprising:

determining whether the first user identifier information matches second user identifier information corresponding to the locked file if the locked file corresponding to the file identifier information is found, and acquiring the locked file from the cache server if the first user identifier information matches the second user identifier information.

Clause 3. The method for reading and writing files of clause 2, after the step of determining whether the first user identifier information matches second user identifier information corresponding to the locked file, further comprising:

generating prompt information of refusing to acquire the locked file, if the first user identifier information does not match the second user identifier information.

Clause 4. The method for reading and writing files of clause 1, wherein after the cache server updates the locked file according to the edited first original file, the method further comprises:

acquiring a second original file from the file server, determining whether first submission information of the locked file in the cache server matches second submission information of the second original file, and submitting the locked file to the file server if the first submission information matches the second submission information, so that the file server replaces the second original file with the locked file.

Clause 5. The method for reading and writing files of clause 4, after the step of determining whether first submission information of the locked file matches second submission information of the second original file, further comprising:

updating the locked file according to the second original file if the first submission information does not match the second submission information, updating the first submission information according to the second submission information, and submitting the updated locked file to the file server.

Clause 6. The method for reading and writing files of clause 1 or 2, further comprising:

receiving an unlocking request for the locked file in the cache server, and deleting the locked file from the cache server when it is determined that the first user identifier information matches the second user identifier information corresponding to the locked file.

Clause 7. The method for reading and writing files of clause 3, after the step of generating prompt information of refusing to acquire the locked file, further comprising:

receiving a replacement request for the second user identifier information, replacing the second user identifier information with the first user identifier information according to the replacement request, and generating prompt information indicating that the second user identifier information is replaced.

Clause 8. An apparatus for reading and writing files comprising:

a first receiving module configured to receive an access request;

a first acquisition module configured to acquire file identifier information and first user identifier information according to the access request;

a query module configured to query a cache server for a locked file corresponding to the file identifier information;

a second acquisition module configured to acquire a first original file corresponding to the file identifier information from a file server when the query module does not find the locked file corresponding to the file identifier information;

a generation module configured to generate a locked file according to the first user identifier information and the first original file;

a submission module configured to submit the locked file to the cache server; and a second receiving module configured to receive an editing operation for the first original file, wherein the submission module submits the edited first original file to the cache server, so that the cache server updates the locked file according to the edited first original file.

Clause 9. The apparatus for reading and writing files of clause 8, further comprising:

a first determination module configured to determine whether the first user identifier information matches second user identifier information corresponding to the locked file when the query module finds the locked file corresponding to the file identifier information, wherein the second acquisition module is further configured to acquire the locked file from the cache server if the first user identifier information matches the second user identifier information.

Clause 10. The apparatus for reading and writing files of clause 9, further comprising:

a first prompt module configured to generate prompt information of refusing to acquire the locked file, when the first user identifier information does not match the second user identifier information.

Clause 11. The apparatus for reading and writing files of clause 8, wherein the second acquisition module is further configured to acquire a second original file from the file server;

the apparatus further comprises: a second determination module configured to determine whether first submission information of the locked file in the cache server matches second submission information of the second original file; and the submission module is further configured to submit the locked file to the file server when the second determination module determines that the first submission information matches the second submission information, so that the file server replaces the second original file with the locked file.

Clause 12. The apparatus for reading and writing files of clause 11, further comprising:

an update module configured to update the locked file according to the second original file when the second determination module determines that the first submission information does not match the second submission information, and update the first submission information according to the second submission information, wherein the submission module is further configured to submit the updated locked file to the file server.

Clause 13. The apparatus for reading and writing files of clause 8 or 9, further comprising:

a third receiving module configured to receive an unlocking request for the locked file in the cache server;

an unlocking module configured to delete the locked file from the cache server when the first determination module determines that the first user identifier information matches the second user identifier information corresponding to the locked file.

Clause 14. The apparatus for reading and writing files of clause 10, further comprising:

a fourth receiving module configured to receive a replacement request for the second user identifier information;

a replacement module configured to replace the second user identifier information with the first user identifier information according to the replacement request; and a second prompt module configured to generate prompt information indicating that the second user identifier information is replaced.

Clause 15. A system for reading and writing files comprising: a Web IDE server, a cache server, and a file server, wherein the Web IDE server is configured to receive an access request, and acquire file identifier information and first user identifier information according to the access request; query the cache server for a locked file corresponding to the file identifier information, and acquire a first original file corresponding to the file identifier information from the file server if the locked file corresponding to the file identifier information is not found; generate a locked file according to the first user identifier information and the first original file, and submit the locked file to the cache server; and receive an editing operation for the first original file, and submit the edited first original file to the cache server; and the cache server is configured to store the locked file, and update the locked file according to the edited first original file.

Clause 16. The system for reading and writing files of clause 15, wherein the Web IDE server is further configured to determine whether the first user identifier information matches second user identifier information corresponding to the locked file when the locked file corresponding to the file identifier information is found, and acquire the locked file from the cache server if the first user identifier information matches the second user identifier information.

Clause 17. The system for reading and writing files of clause 16, wherein the Web IDE server is further configured to generate prompt information of refusing to acquire the locked file, when the first user identifier information does not match the second user identifier information.

Clause 18. The system for reading and writing files of clause 15, wherein the file server stores a second original file, and the second original file is an updated version of the first original file;

the Web IDE server is further configured to acquire the second original file from the file server, determine whether first submission information of the locked file in the cache server matches second submission information of the second original file, and submit the locked file to the file server when the first submission information matches the second submission information; and the file server is further configured to replace the second original file with the locked file.

Clause 19. The system for reading and writing files of clause 18, wherein the Web IDE server is further configured to update the locked file according to the second original file when the first submission information does not match the second submission information, update the first submission information according to the second submission information, and submit the updated locked file to the file server; and the file server is further configured to replace the second original file with the updated locked file.

Clause 20. The system for reading and writing files of clause 15 or 16, wherein the Web IDE server is further configured to receive an unlocking request for the locked file in the cache server, and delete the locked file from the cache server when it is determined that the first user identifier information matches the second user identifier information corresponding to the locked file.

Clause 21. The system for reading and writing files of clause 17, wherein the Web IDE server is further configured to receive a replacement request for the second user identifier information, replace the second user identifier information with the first user identifier information according to the replacement request, and generate prompt information indicating that the second user identifier information is replaced.

What is claimed is:

1. A method comprising:
   receiving an access request;
   acquiring file identifier information and first user identifier information according to the access request;
   querying a cache server for a locked file corresponding to the file identifier information;
   acquiring a first original file corresponding to the file identifier information from a file server in response to determining that the locked file corresponding to the file identifier information is not found;
   generating a locked file according to the first user identifier information and the first original file;
   submitting the locked file to the cache server;
   receiving an editing operation for the first original file; and
   submitting the edited first original file to the cache server to request the cache server to update the locked file according to the edited first original file.

2. The method of claim 1, further comprising:
   after the querying the cache server for the locked file,
   determining whether the first user identifier information matches second user identifier information corresponding to the locked file, in response to determining that the locked file corresponding to the file identifier information is found; and
   acquiring the locked file from the cache server in response to determining that the first user identifier information matches the second user identifier information.

3. The method of claim 2, further comprising:
   generating prompt information of refusing to acquire the locked file, in response to determining that the first user identifier information does not match the second user identifier information.

4. The method of claim 3, further comprising:
   receiving a replacement request for the second user identifier information;
   replacing the second user identifier information with the first user identifier information according to the replacement request; and
   generating prompt information indicating that the second user identifier information is replaced.

5. The method of claim 1, further comprising:
   acquiring a second original file from the file server,
   determining whether first submission information of the locked file in the cache server matches second submission information of the second original file; and
   submitting the locked file to the file server, in response to determining that the first submission information matches the second submission information, so that the file server replaces the second original file with the locked file.

6. The method of claim 5, further comprising:
updating the locked file according to the second original file, in response to determining that the first submission information does not match the second submission information;
updating the first submission information according to the second submission information; and
submitting the updated locked file to the file server.

7. The method of claim 1, further comprising:
receiving an unlocking request for the locked file in the cache server; and
deleting the locked file from the cache server, in response to determining that the first user identifier information matches the second user identifier information corresponding to the locked file.

8. An apparatus comprising:
one or more processors; and
one or more memories storing thereon computer-readable instructions that, when executed by the one or more processors, cause the one or more processors to perform acts comprising:
receiving an access request;
acquiring file identifier information and first user identifier information according to the access request;
querying a cache server for a locked file corresponding to the file identifier information;
acquiring a first original file corresponding to the file identifier information from a file server in response to determining that the locked file corresponding to the file identifier information is not found;
generating a locked file according to the first user identifier information and the first original file;
submitting the locked file to the cache server;
receiving an editing operation for the first original file; and
submitting the edited first original file to the cache server to request the cache server to update the locked file according to the edited first original file.

9. The apparatus of claim 8, wherein the acts further comprise:
after the querying the cache server for the locked file,
determining whether the first user identifier information matches second user identifier information corresponding to the locked file, in response to determining that the locked file corresponding to the file identifier information is found; and
acquiring the locked file from the cache server in response to determining that the first user identifier information matches the second user identifier information.

10. The apparatus of claim 9, wherein the acts further comprise:
generating prompt information of refusing to acquire the locked file, in response to determining that the first user identifier information does not match the second user identifier information.

11. The apparatus of claim 10, wherein the acts further comprise:
receiving a replacement request for the second user identifier information;
replacing the second user identifier information with the first user identifier information according to the replacement request; and
generating prompt information indicating that the second user identifier information is replaced.

12. The apparatus of claim 8, wherein the acts further comprise:
acquiring a second original file from the file server,
determining whether first submission information of the locked file in the cache server matches second submission information of the second original file; and
submitting the locked file to the file server, in response to determining that the first submission information matches the second submission information, so that the file server replaces the second original file with the locked file.

13. The apparatus of claim 12, wherein the acts further comprise:
updating the locked file according to the second original file, in response to determining that the first submission information does not match the second submission information;
updating the first submission information according to the second submission information; and
submitting the updated locked file to the file server.

14. The apparatus of claim 8, wherein the acts further comprise:
receiving an unlocking request for the locked file in the cache server; and
deleting the locked file from the cache server, in response to determining that the first user identifier information matches the second user identifier information corresponding to the locked file.

15. A system comprising:
a server for web-based integrated development environment (Web IDE server) including:
first one or more processors; and
first one or more memories storing thereon computer-readable instructions that, when executed by the one or more processors, cause the one or more processors to perform first acts comprising:
receiving an access request;
acquiring file identifier information and first user identifier information according to the access request;
querying a cache server for a locked file corresponding to the file identifier information;
acquiring a first original file corresponding to the file identifier information from a file server in response to determining that the locked file corresponding to the file identifier information is not found;
generating a locked file according to the first user identifier information and the first original file;
submitting the locked file to the cache server;
receiving an editing operation for the first original file; and
submitting the edited first original file to the cache server to request the cache server to update the locked file according to the edited first original file.

16. The system of claim 15, further comprising:
the cache server including:
second one or more processors; and
second one or more memories storing thereon computer-readable instructions that, when executed by the one or more processors, cause the one or more processors to perform second acts comprising:
acquiring a second original file from the file server,
determining whether first submission information of the locked file in the cache server matches second submission information of the second original file; and
submitting the locked file to the file server, in response to determining that the first submission information matches the second submission information, so that the file server replaces the second original file with the locked file.

17. The system of claim 16, wherein the second acts further comprise:
updating the locked file according to the second original file, in response to determining that the first submission information does not match the second submission information; and
updating the first submission information according to the second submission information.

18. The system of claim 17, wherein the second acts further comprise:
submitting the updated locked file to the file server.

19. The system of claim 15, wherein the first acts further comprise:
after the querying the cache server for the locked file,
determining whether the first user identifier information matches second user identifier information corresponding to the locked file, in response to determining that the locked file corresponding to the file identifier information is found; and
acquiring the locked file from the cache server in response to determining that the first user identifier information matches the second user identifier information.

20. The system of claim 15, wherein the first acts further comprise:
receiving an unlocking request for the locked file in the cache server; and
deleting the locked file from the cache server, in response to determining that the first user identifier information matches the second user identifier information corresponding to the locked file.

* * * * *